Figure 1:
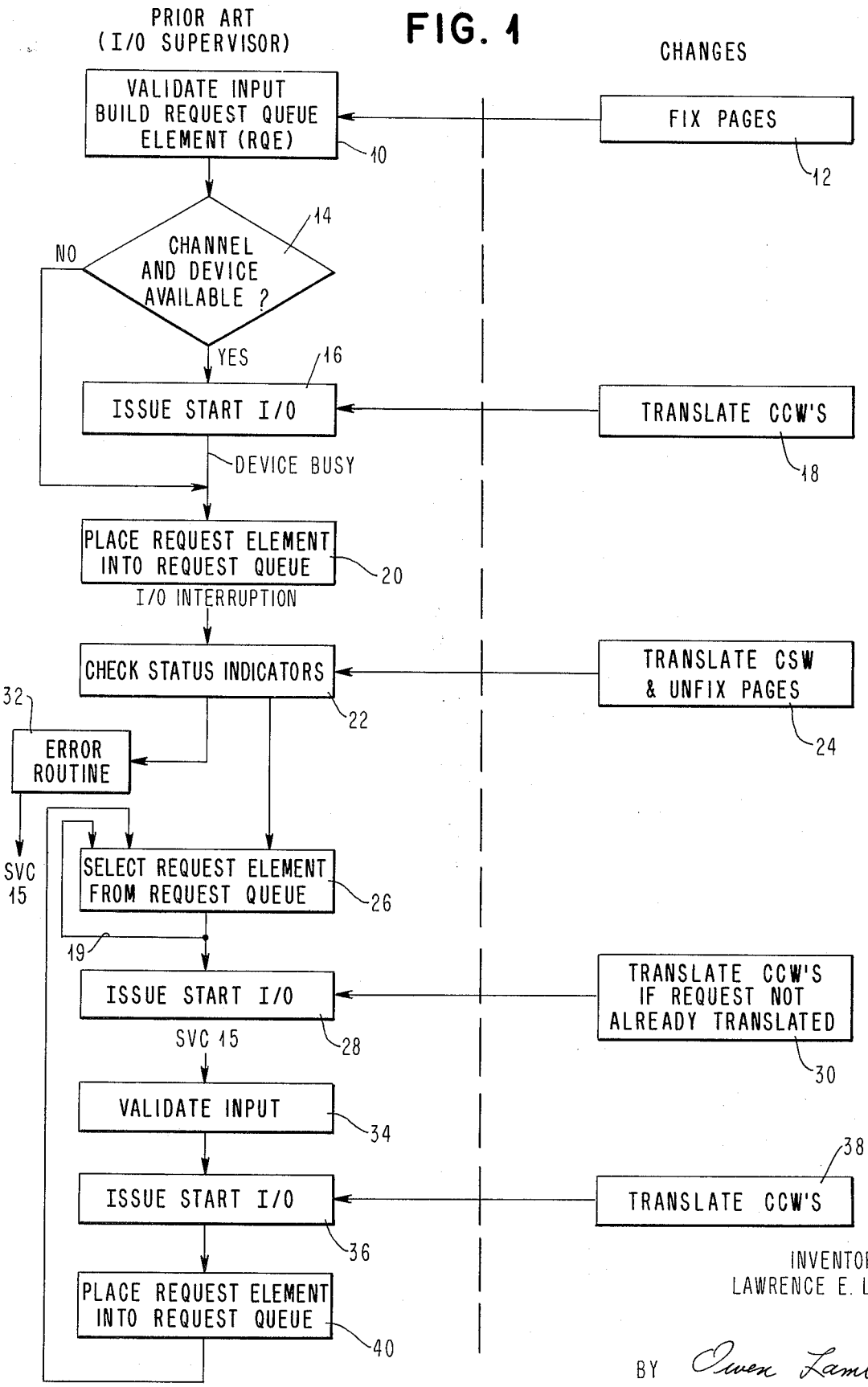

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 10

T940,019

CHANNEL PROGRAM TRANSLATION

Lawrence Edward Larson, Vestal, N.Y., assignor to International Business Machines Corporation, Armonk, N.Y.

Continuation of application Ser. No. 211,913, Dec. 27, 1973. This application Mar. 26, 1974, Ser. No. 454,895

Int. Cl. G06f *13/08, 9/20*

U.S. Cl. 444—1

23 Sheets Drawing. 61 Pages Specification

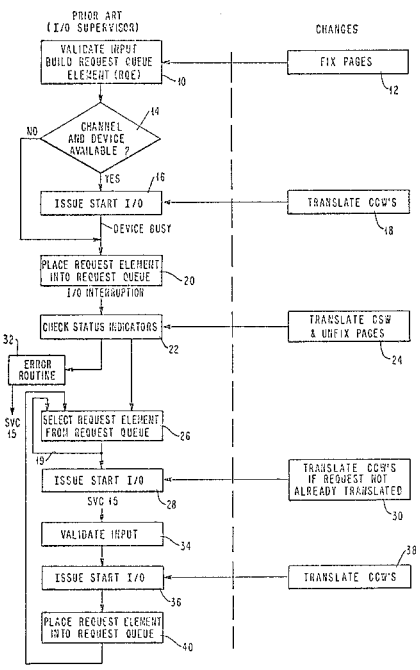

A CCW (channel command word) string in virtual memory is moved to real storage addresses, and the data addresses in the CCW string are replaced with corresponding real addresses.

The I/O supervisor (IOS) checks all input received (block 10) and builds a control block called a request queue element (RQE). If needed, IOS fixes the pages contained in the control blocks passed to it (block 12). If a device is free (block 14), a start I/O instruction is issued (block 16). CCW translation 18 is necessary to insure that the channel program contains only real addresses.

A table of limit addresses is constructed in a work area and contains the address of the first virtual CCW in a string and the address of the current CCW undergoing translation. Transfer-in-channel commands (TIC's) (commands which branch to another part of the channel program) have their transfer-to addresses compared with the limit addresses stored in the table. If the transfer-to address falls within the limits, the TIC is immediately resolved to its real counterpart. If the address falls outside the limits, the TIC is put on an unresolved TIC list to be resolved after the entire CCW string has been translated.

If the CCW string crosses page boundaries, an indirect address list is constructed for the CCW. The indirect address list provides a series of beginning addresses for a discontinuous string of data storage. The list is referenced by an indirect address stored in the translated CCW. A flag is turned on in the CCW to indicate to the channel program that the indirect address list is to be referenced.

If a device or channel is busy or unavailable, the I/O supervisor places the RQE into a queue (block 20).

If CCW translation was performed during the start I/O operation, the channel status word (CSW) is translated (block 24) so that it contains the correct virtual address. Any pages specifically fixed for this I/O operation are now unfixed. Status indicators are checked (block 22). If the I/O activity was not completed successfully, the supervisor invokes an error routine (block 32) which may attempt the activity again.

If the I/O activity was completed successfully, previously scheduled I/O operations are started by selecting an RQE from the request queue (block 26). The queue is checked repeatedly (path 19) until no scheduled requests remain. A start I/O is issued for each request (block 28) and CCW's not already translated are translated (block 30).

If an error routine 32 is invoked, return from the routine enters the I/O supervisor via SVC15. The operation is retired as illustrated by blocks 34, 36, 38 and 40.

INVENTOR
LAWRENCE E. LARSON

BY Owen Lamb
ATTORNEY

Figures 2A, 2E:
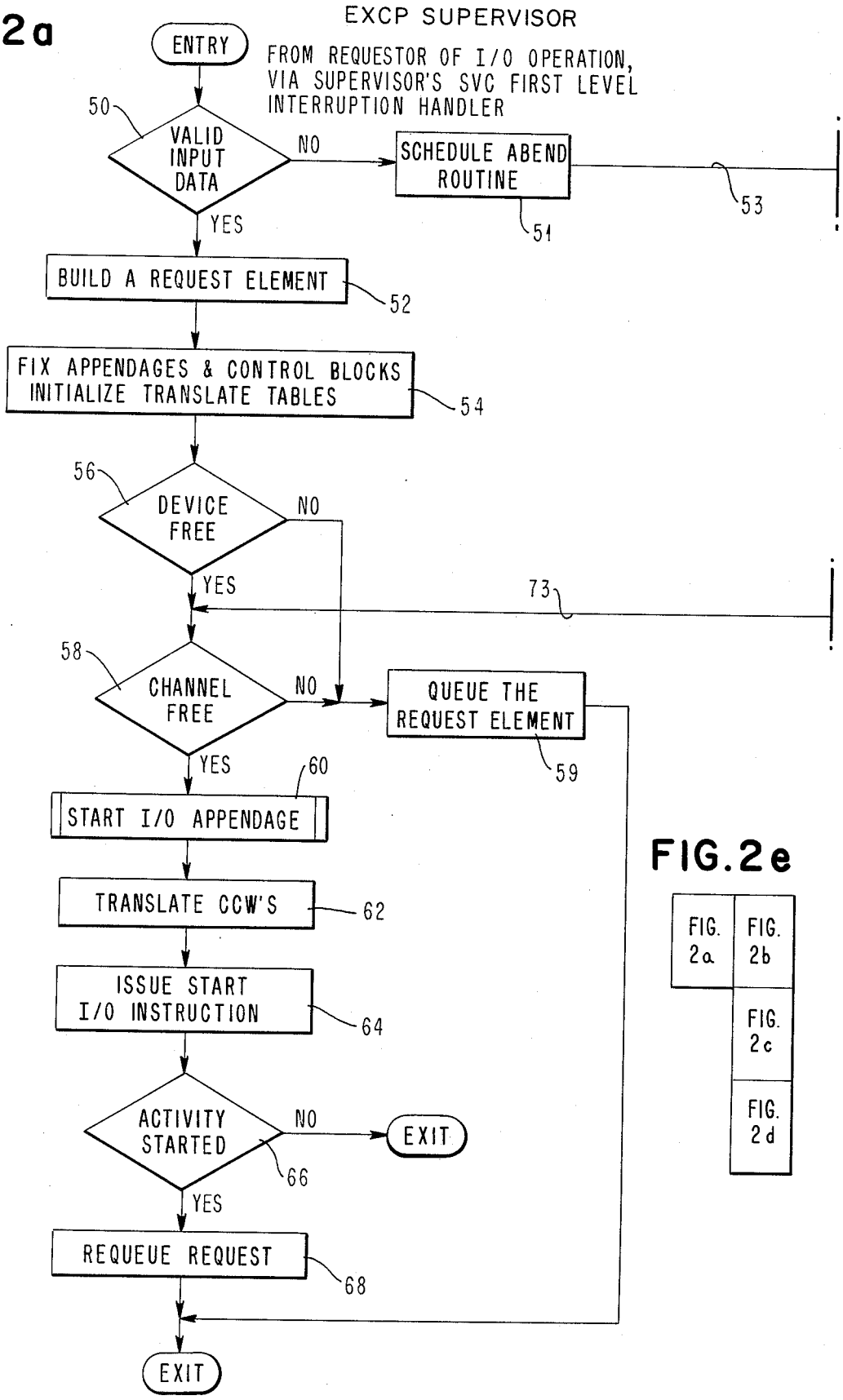

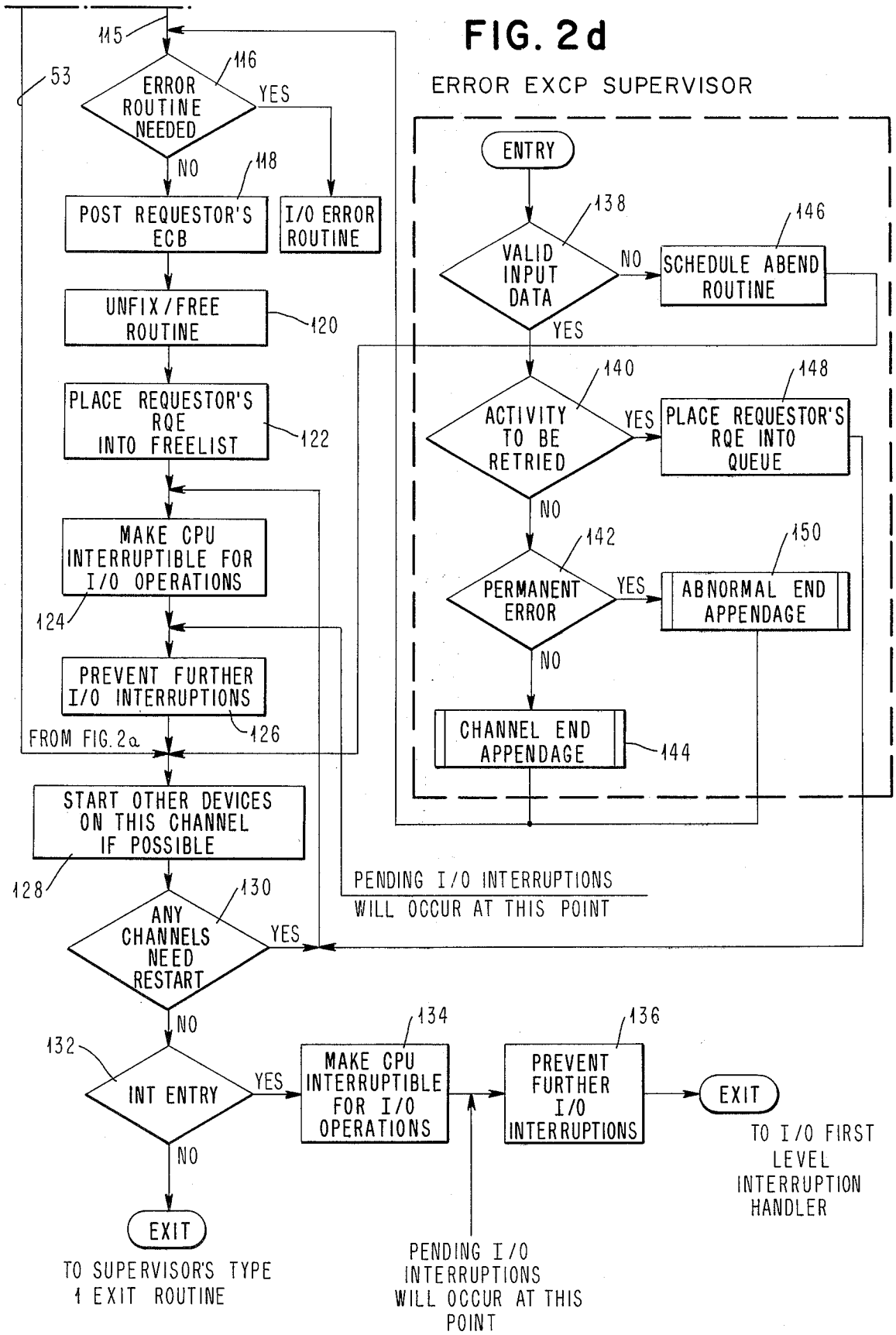
FIG. 2d
ERROR EXCP SUPERVISOR
115
53
116
ERROR ROUTINE NEEDED
YES
NO
118
POST REQUESTOR'S ECB
I/O ERROR ROUTINE
UNFIX/FREE ROUTINE
120
PLACE REQUESTOR'S RQE INTO FREELIST
122
MAKE CPU INTERRUPTIBLE FOR I/O OPERATIONS
124
PREVENT FURTHER I/O INTERRUPTIONS
126
FROM FIG. 2a
START OTHER DEVICES ON THIS CHANNEL IF POSSIBLE
128
130
ANY CHANNELS NEED RESTART
YES
NO
132
INT ENTRY
YES
NO
134
MAKE CPU INTERRUPTIBLE FOR I/O OPERATIONS
136
PREVENT FURTHER I/O INTERRUPTIONS
EXIT
TO I/O FIRST LEVEL INTERRUPTION HANDLER
EXIT
TO SUPERVISOR'S TYPE 1 EXIT ROUTINE
PENDING I/O INTERRUPTIONS WILL OCCUR AT THIS POINT
PENDING I/O INTERRUPTIONS WILL OCCUR AT THIS POINT
ENTRY
138
VALID INPUT DATA
NO
146
SCHEDULE ABEND ROUTINE
YES
140
ACTIVITY TO BE RETRIED
YES
148
PLACE REQUESTOR'S RQE INTO QUEUE
NO
142
PERMANENT ERROR
YES
150
ABNORMAL END APPENDAGE
NO
CHANNEL END APPENDAGE
144

INITIALIZATION OF TRANSLATE TABLES & FIXING USER'S APPENDAGES & CONTROL BLOCKS

CCW TRANSLATION

Figure 2B:
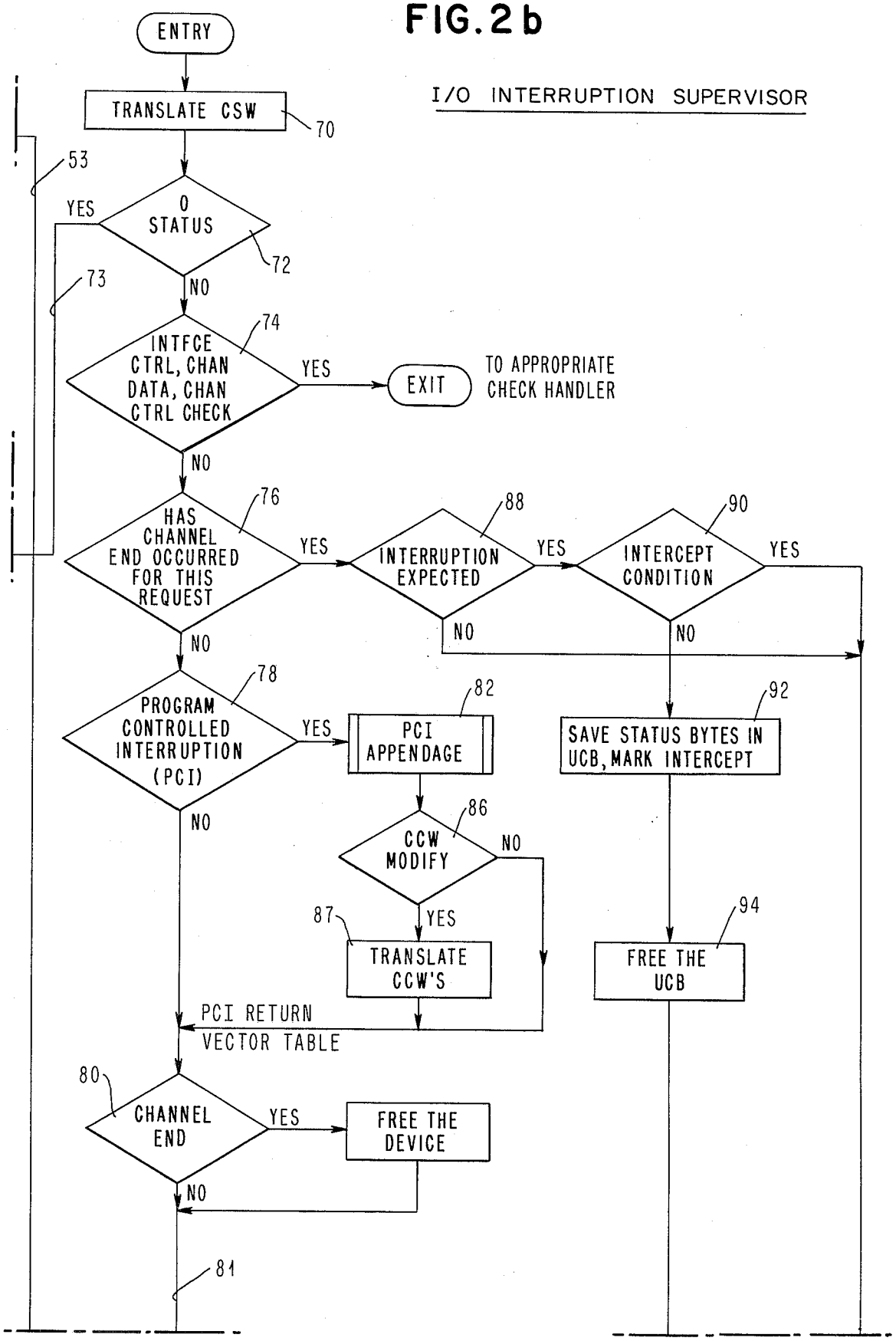
Figure 2C:
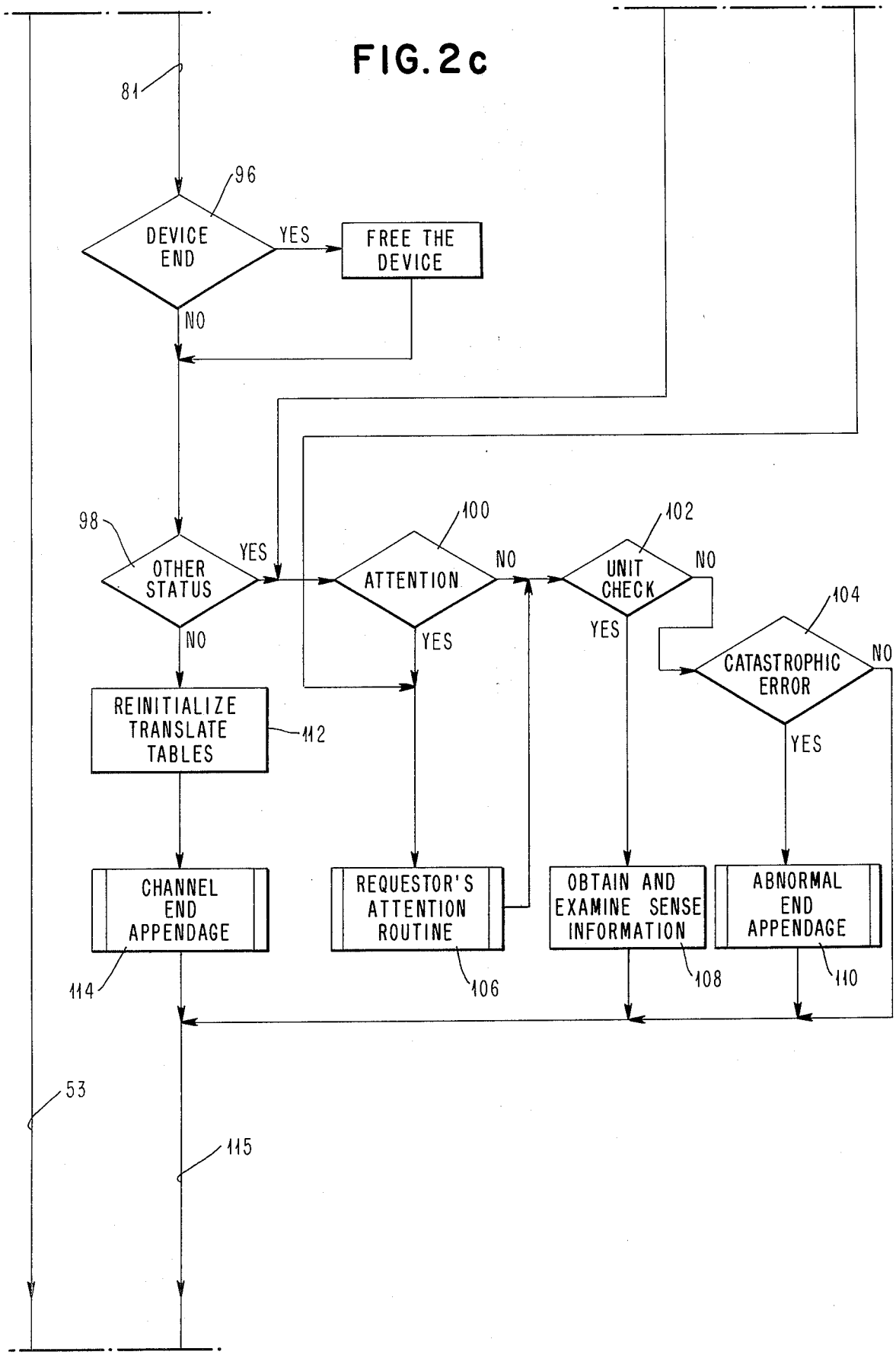
Figure 3:
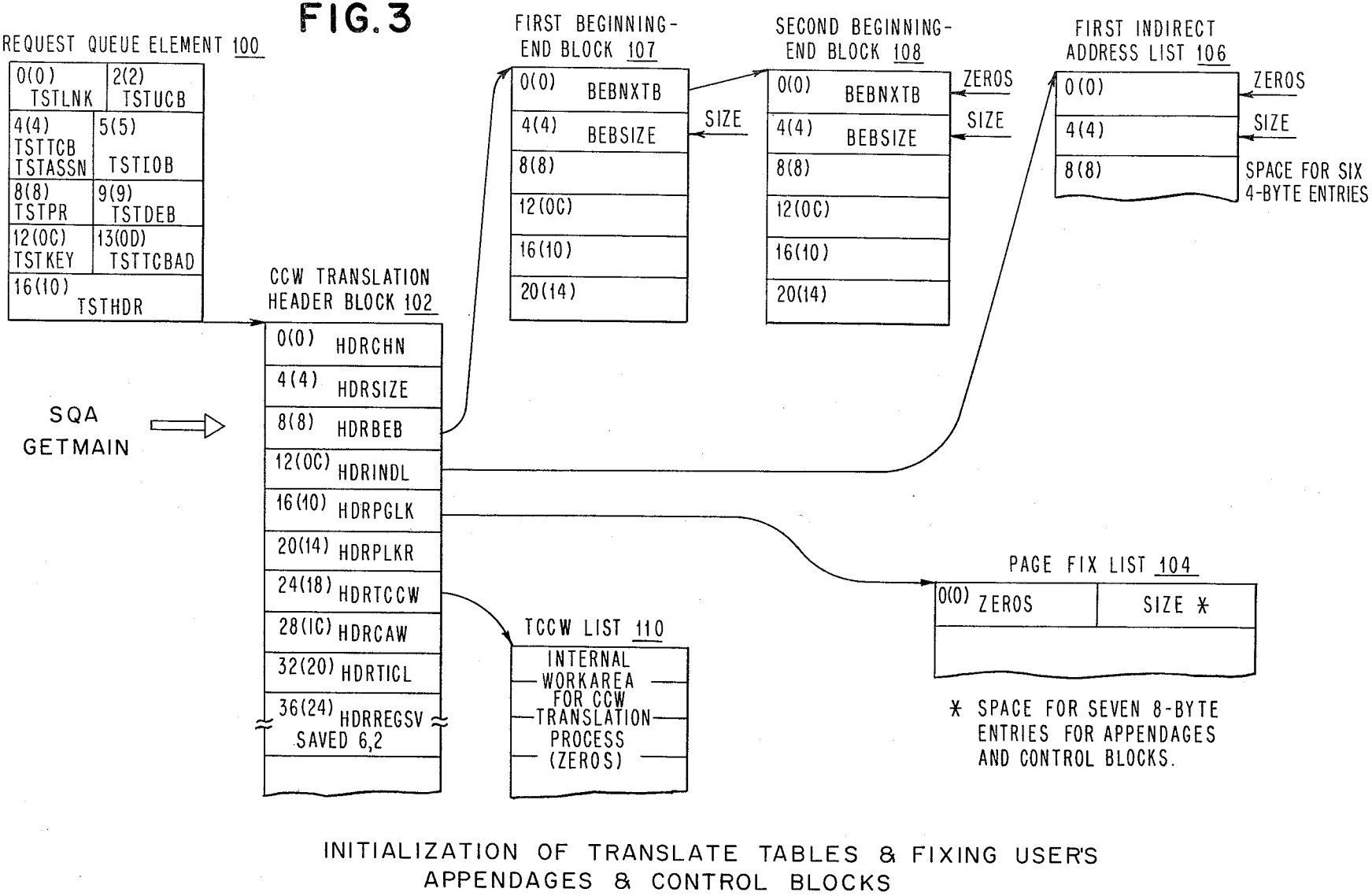
Figure 4:
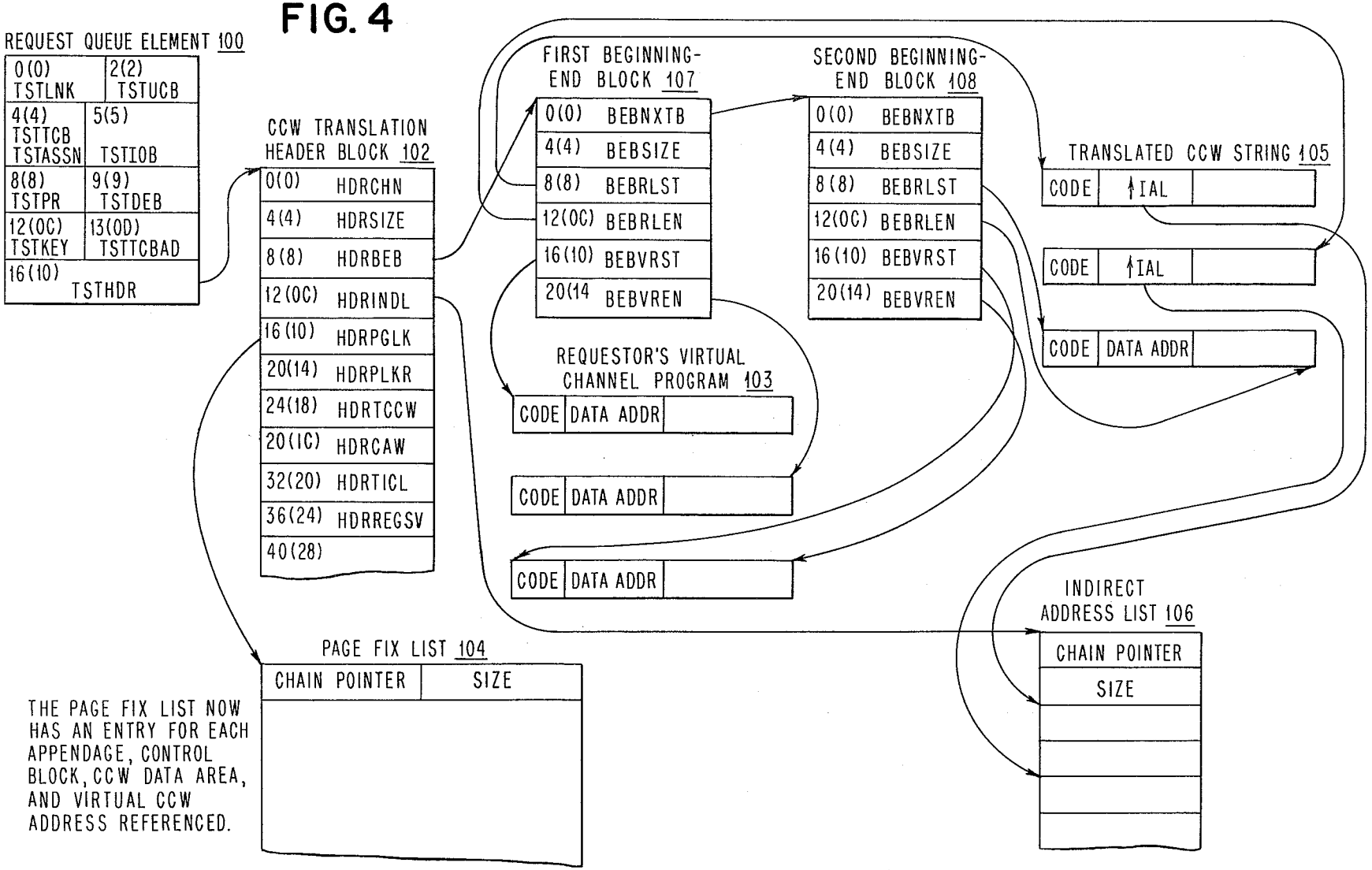
Figure 5:
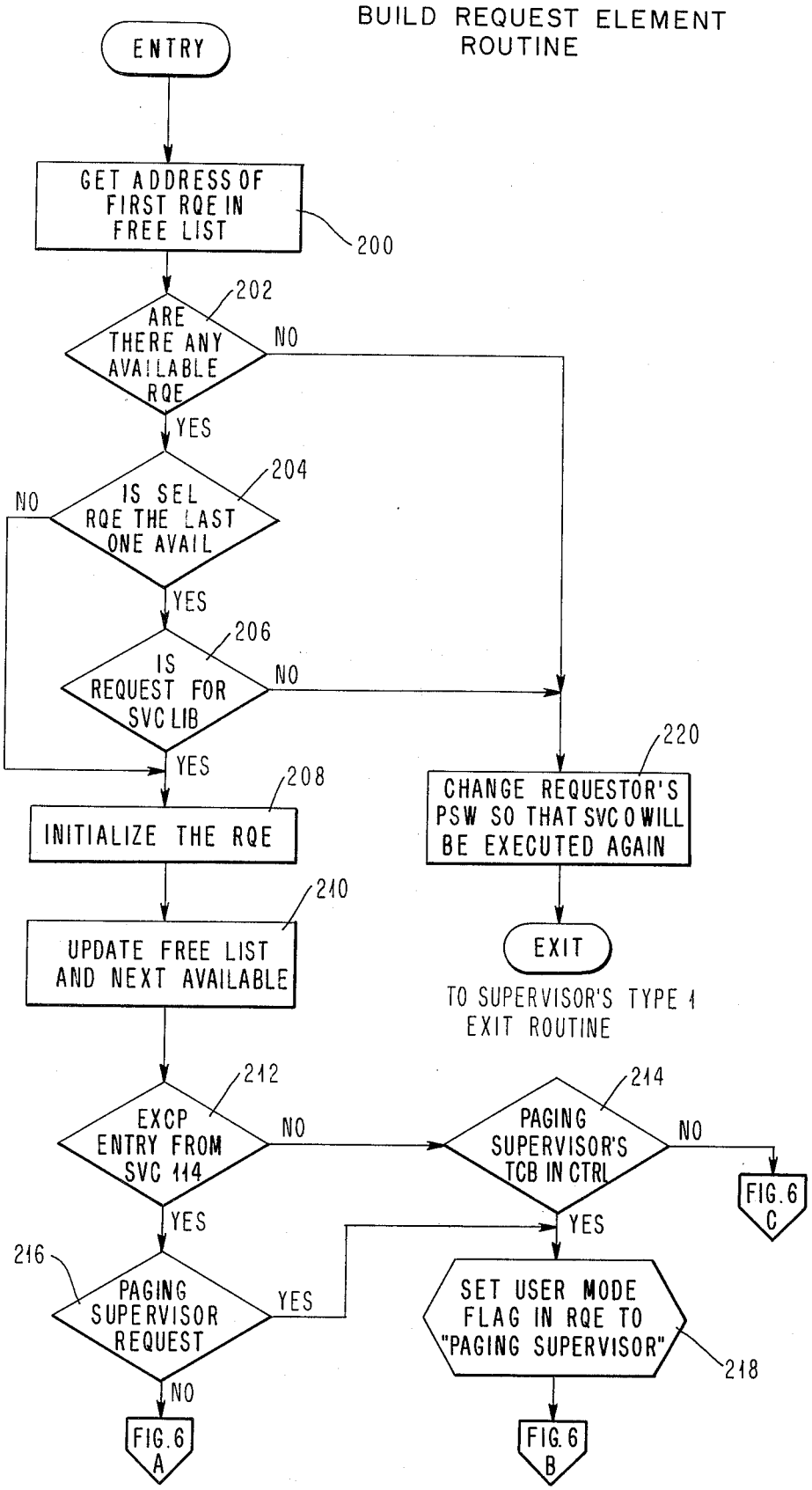
Figure 7:
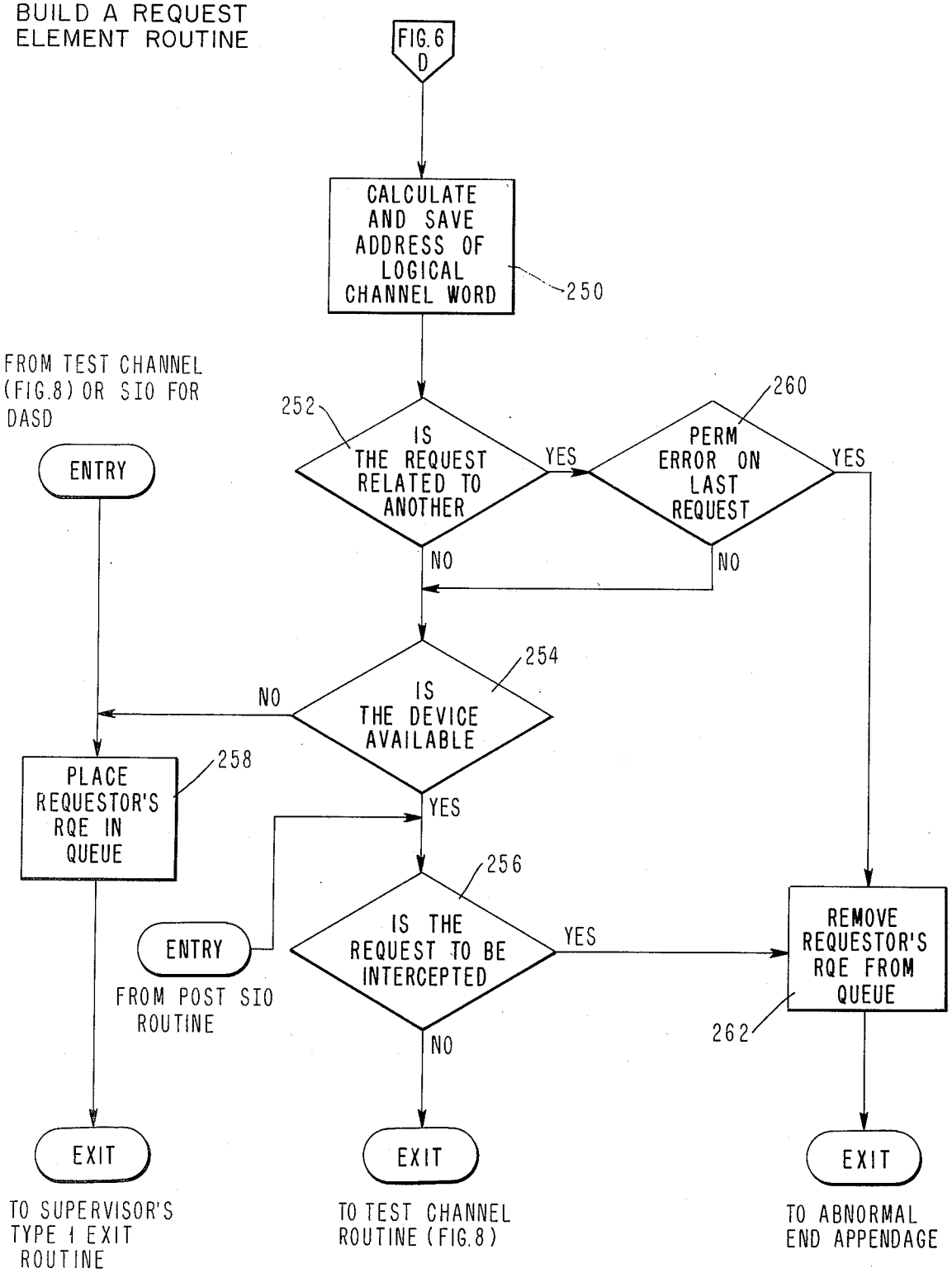
Figure 8:
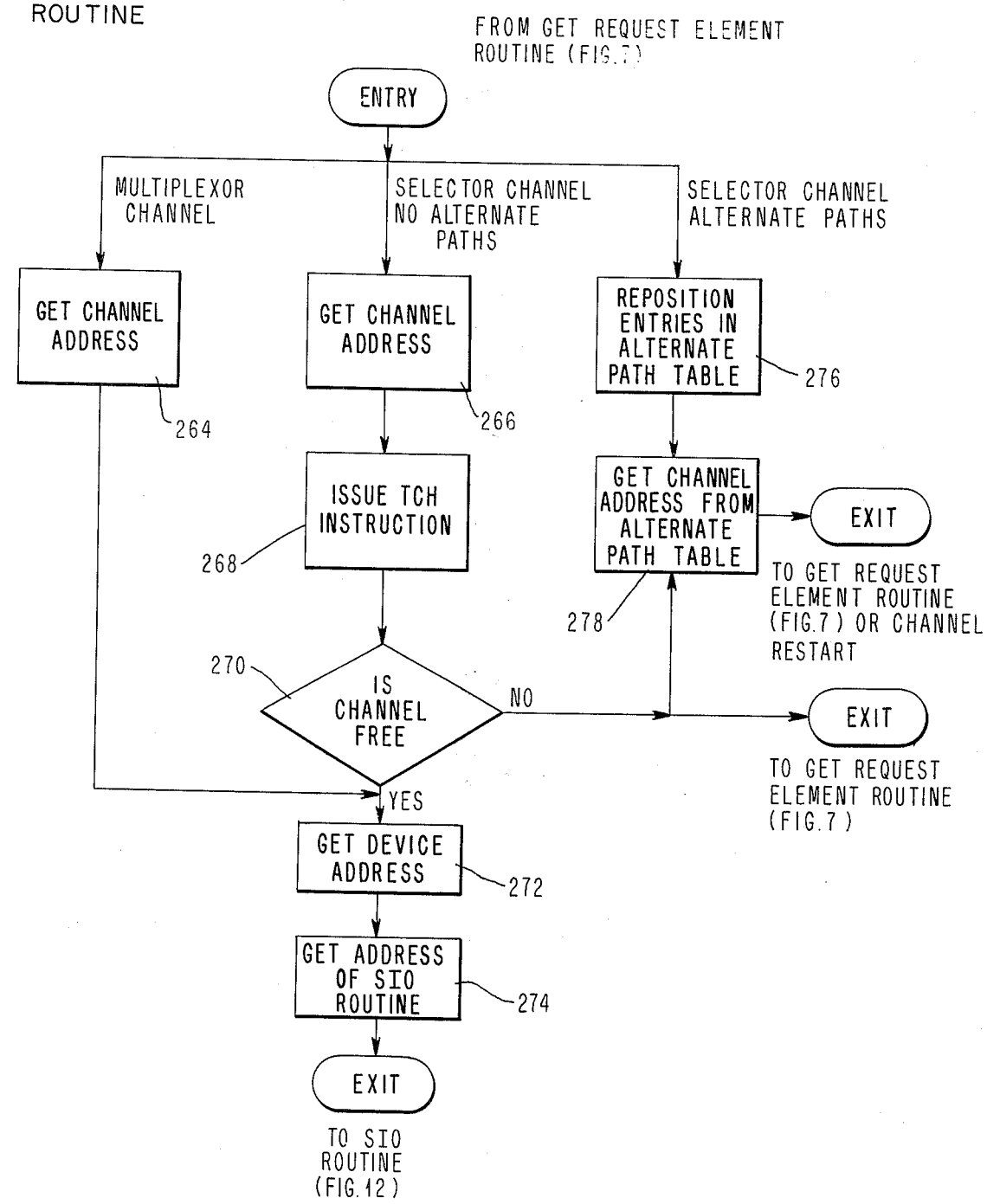
Figure 9:
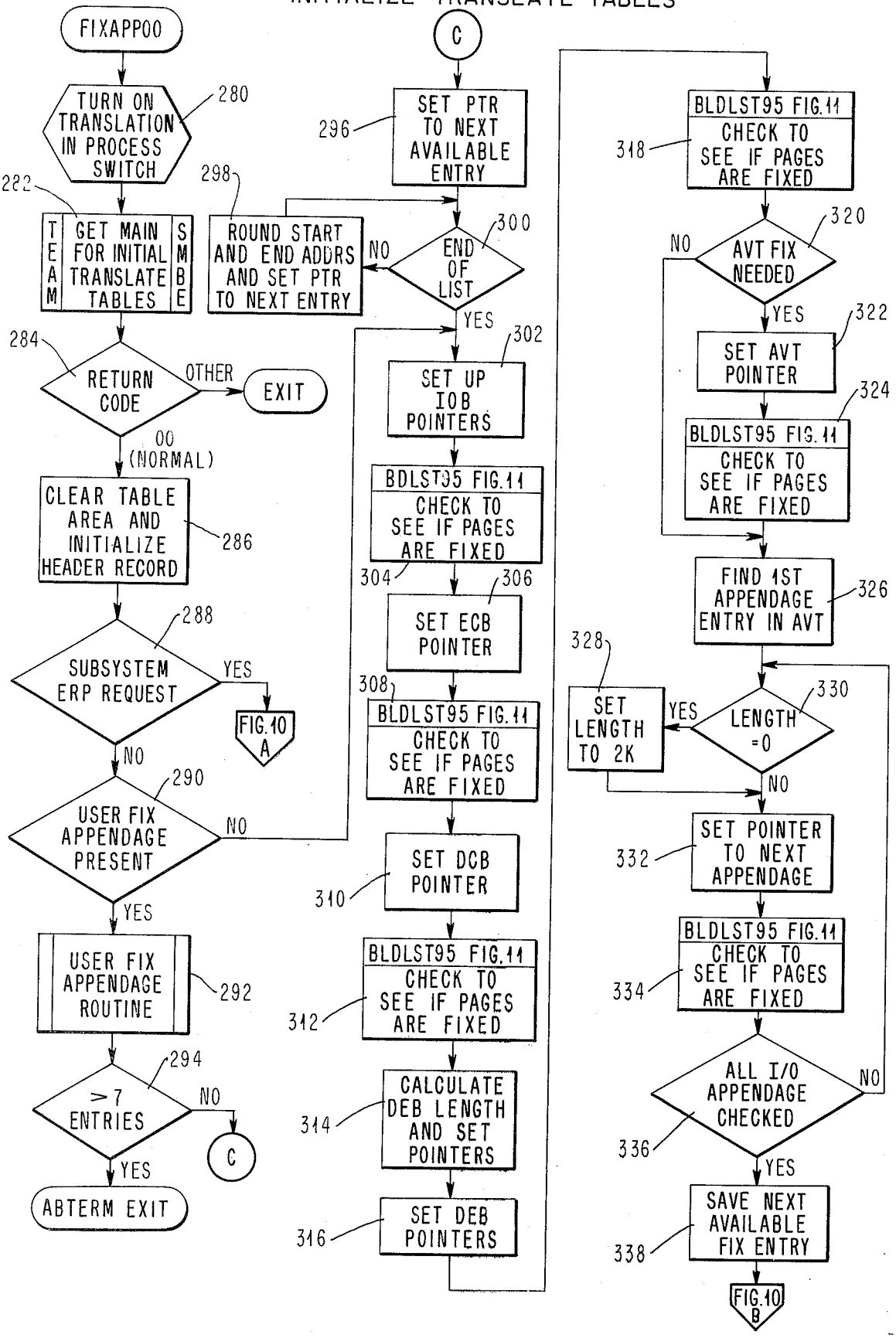
Figure 10:
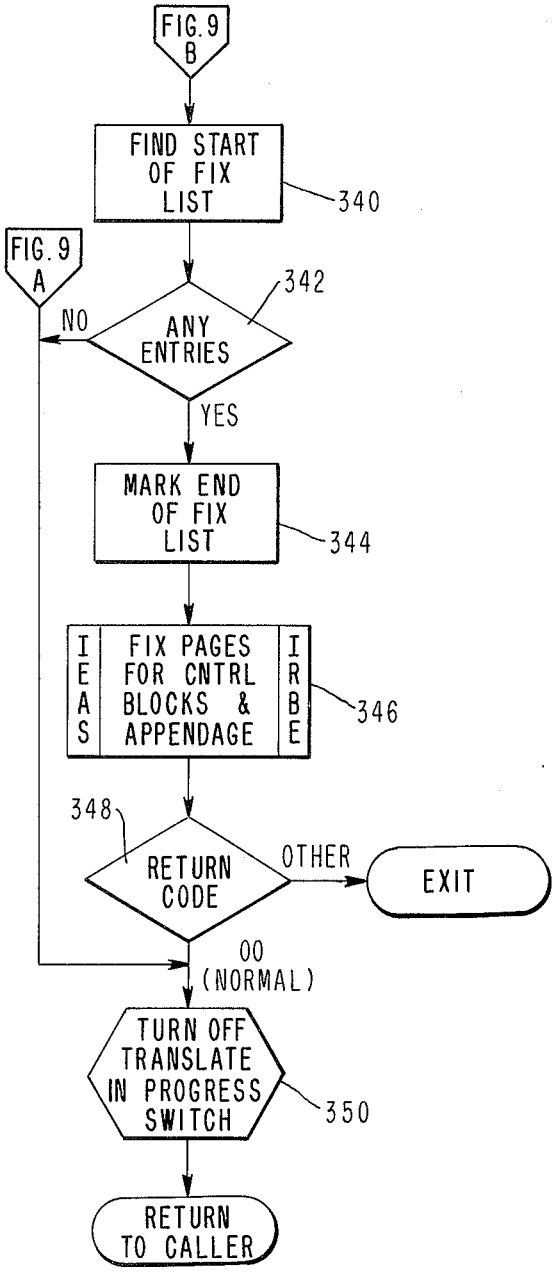
Figure 11:
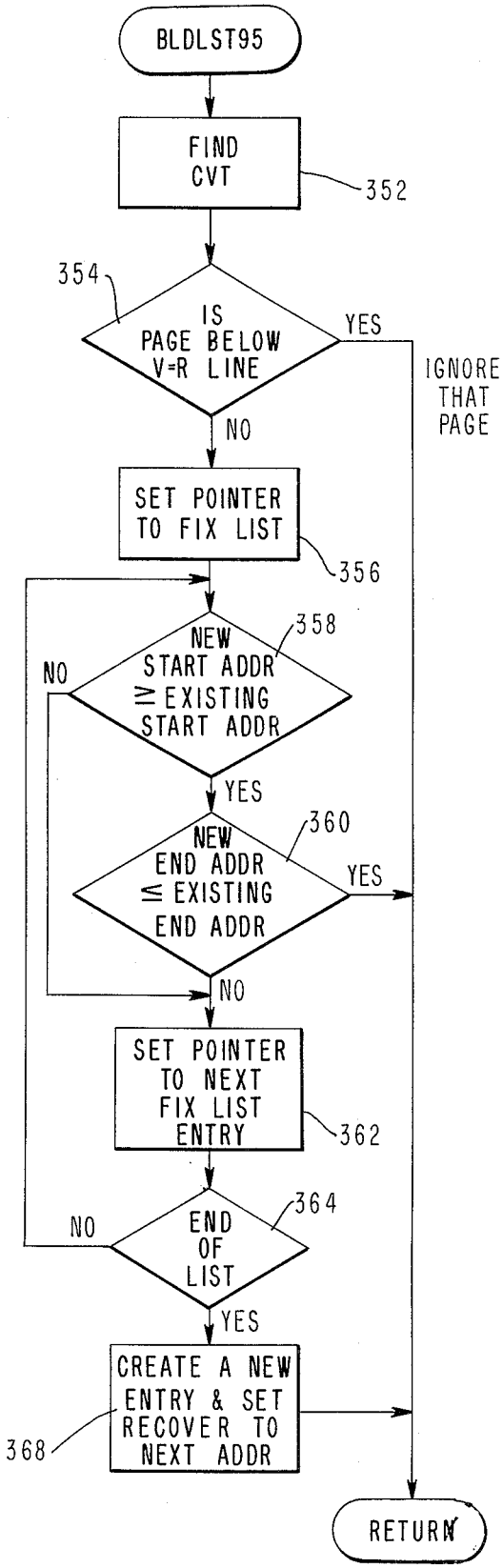
Figure 12:
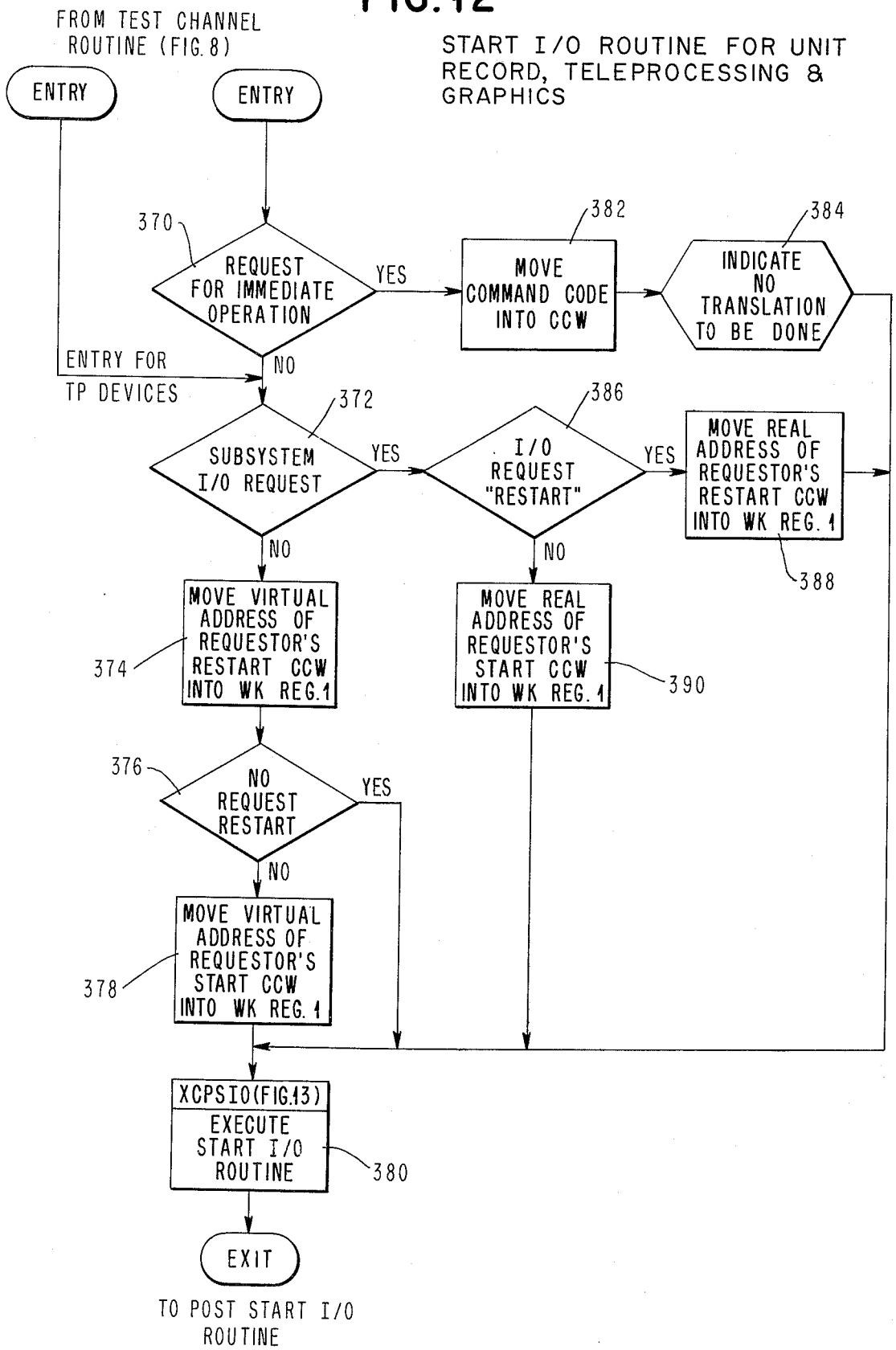
Figure 13:
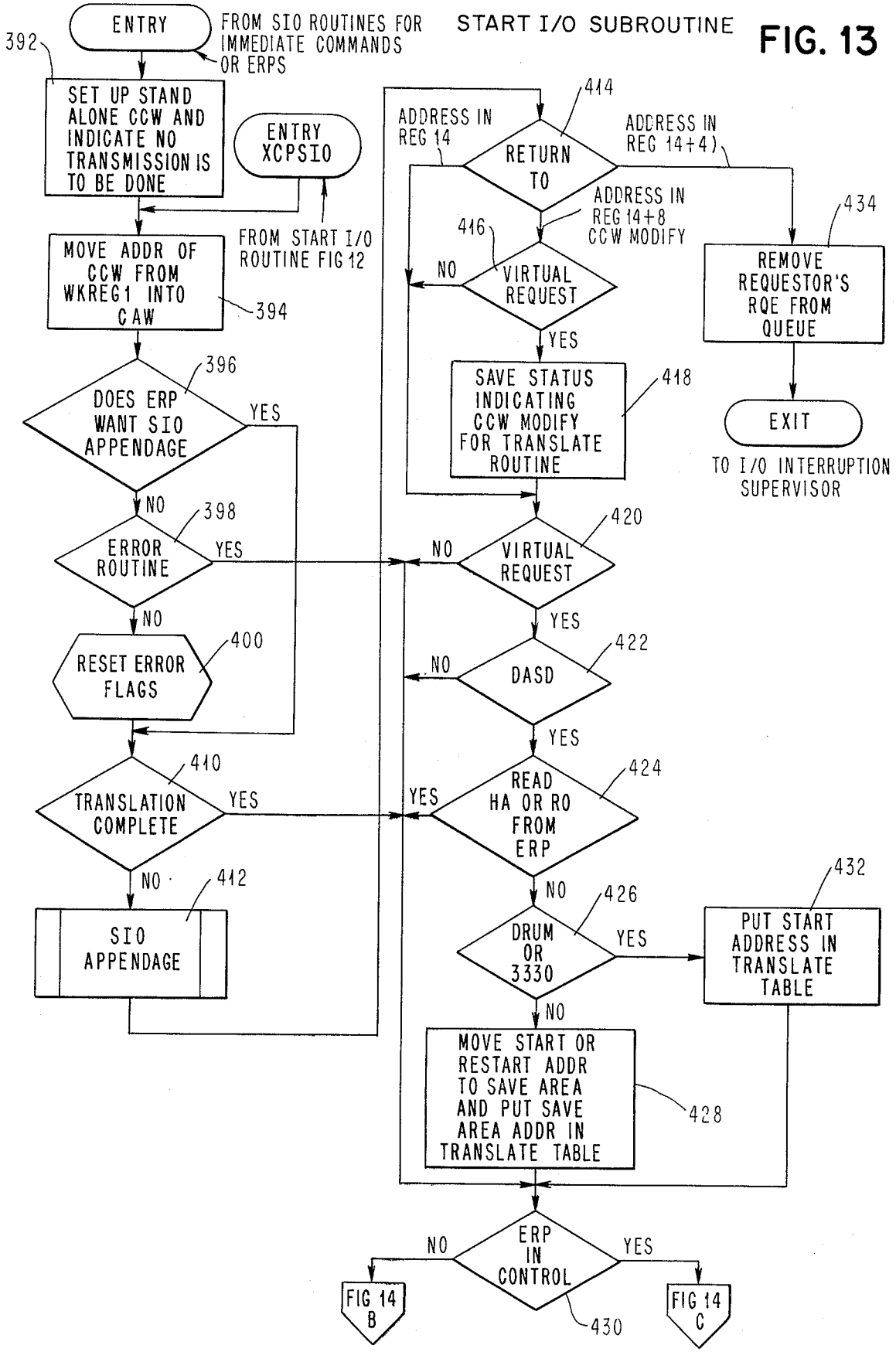
Figure 14:
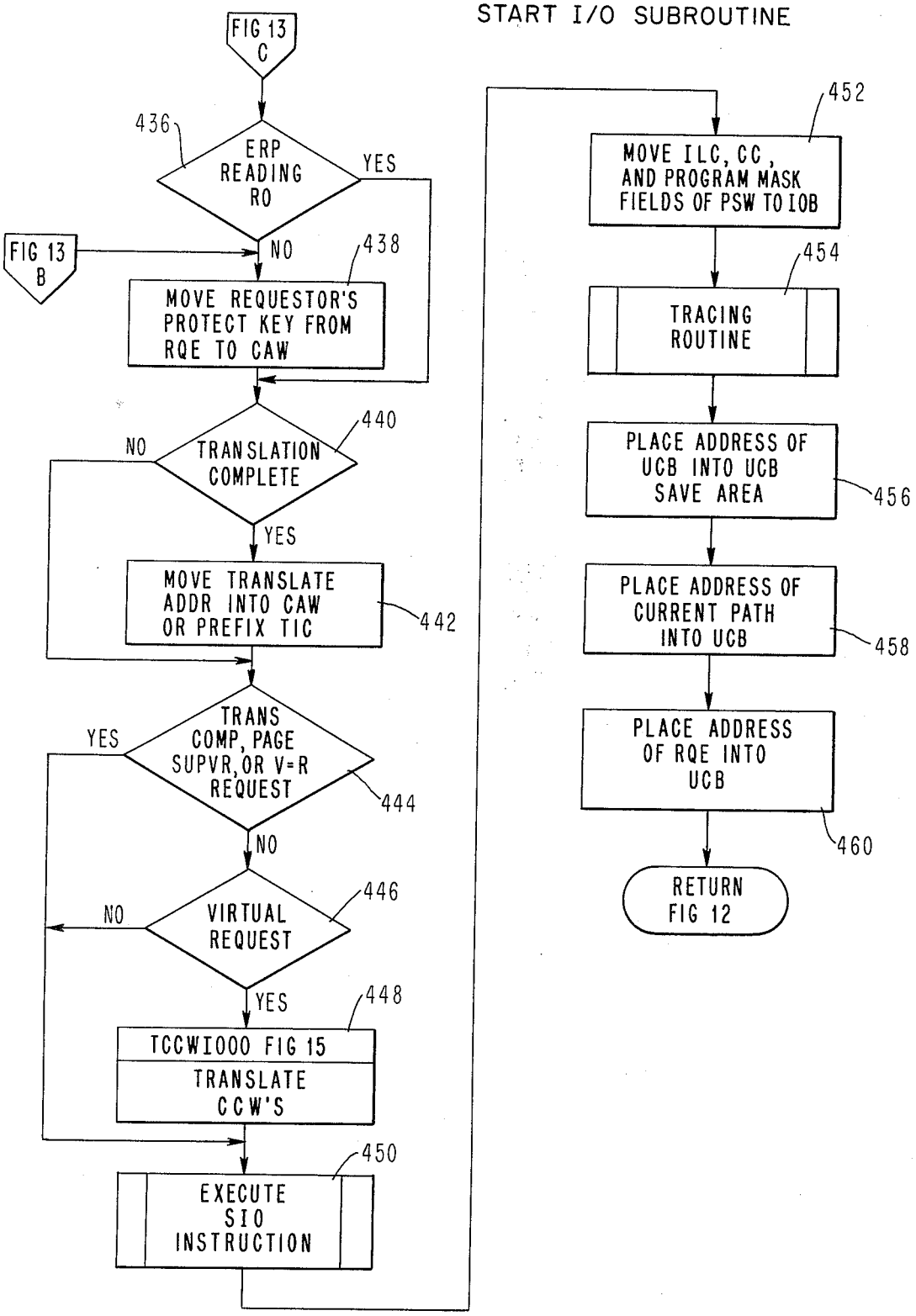
Figure 15:
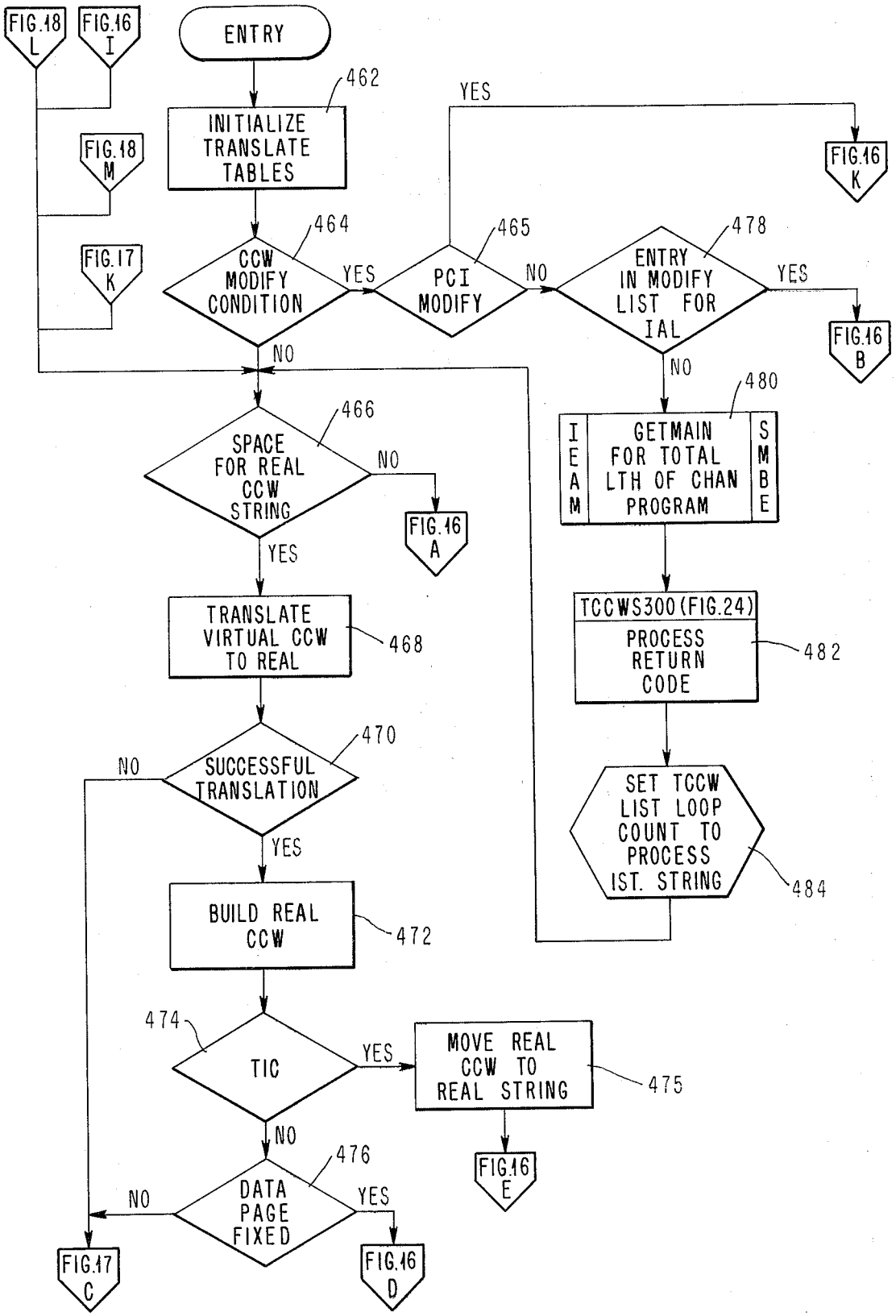
Figure 16:
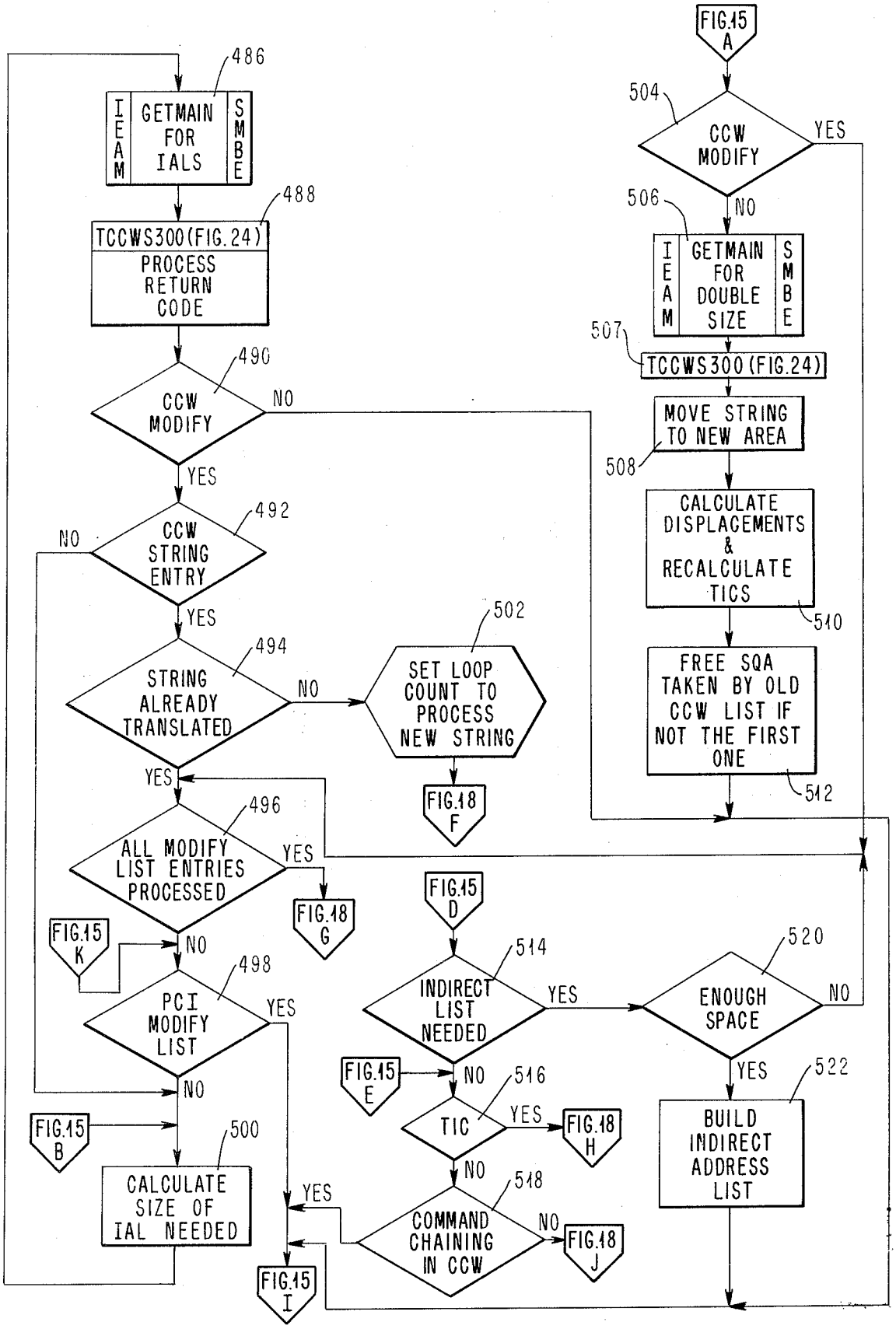
Figure 17:
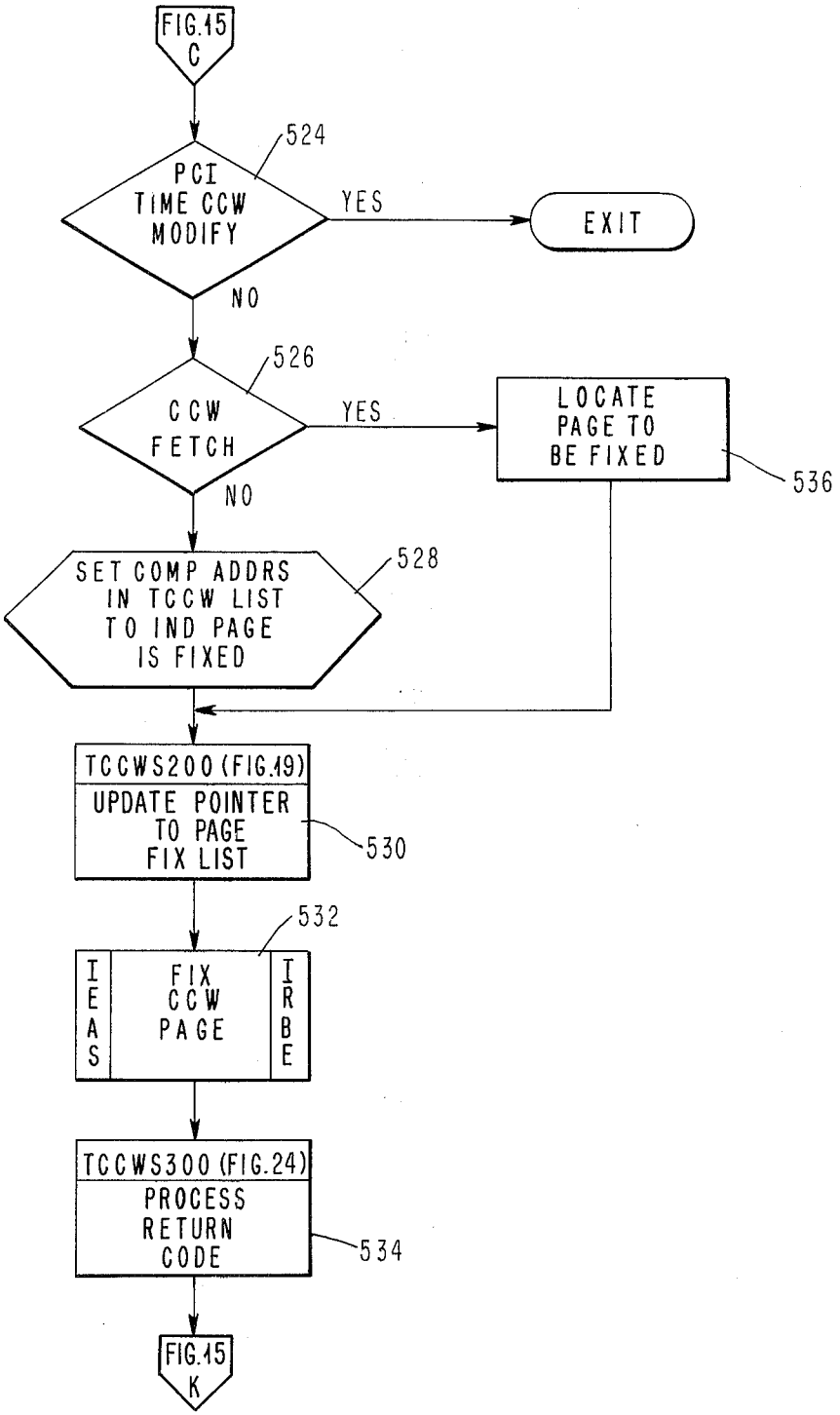
Figure 18:
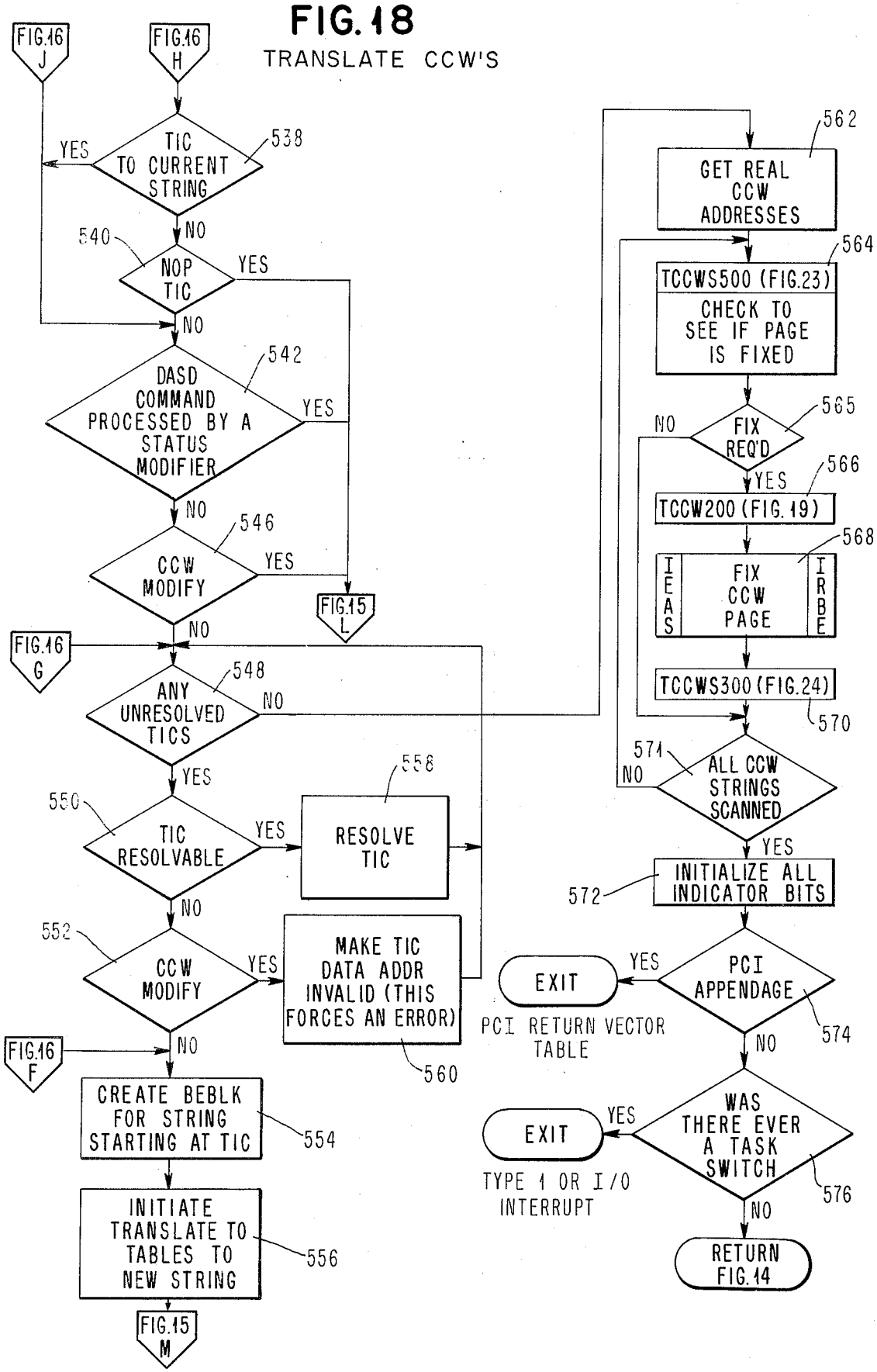
Figure 19:
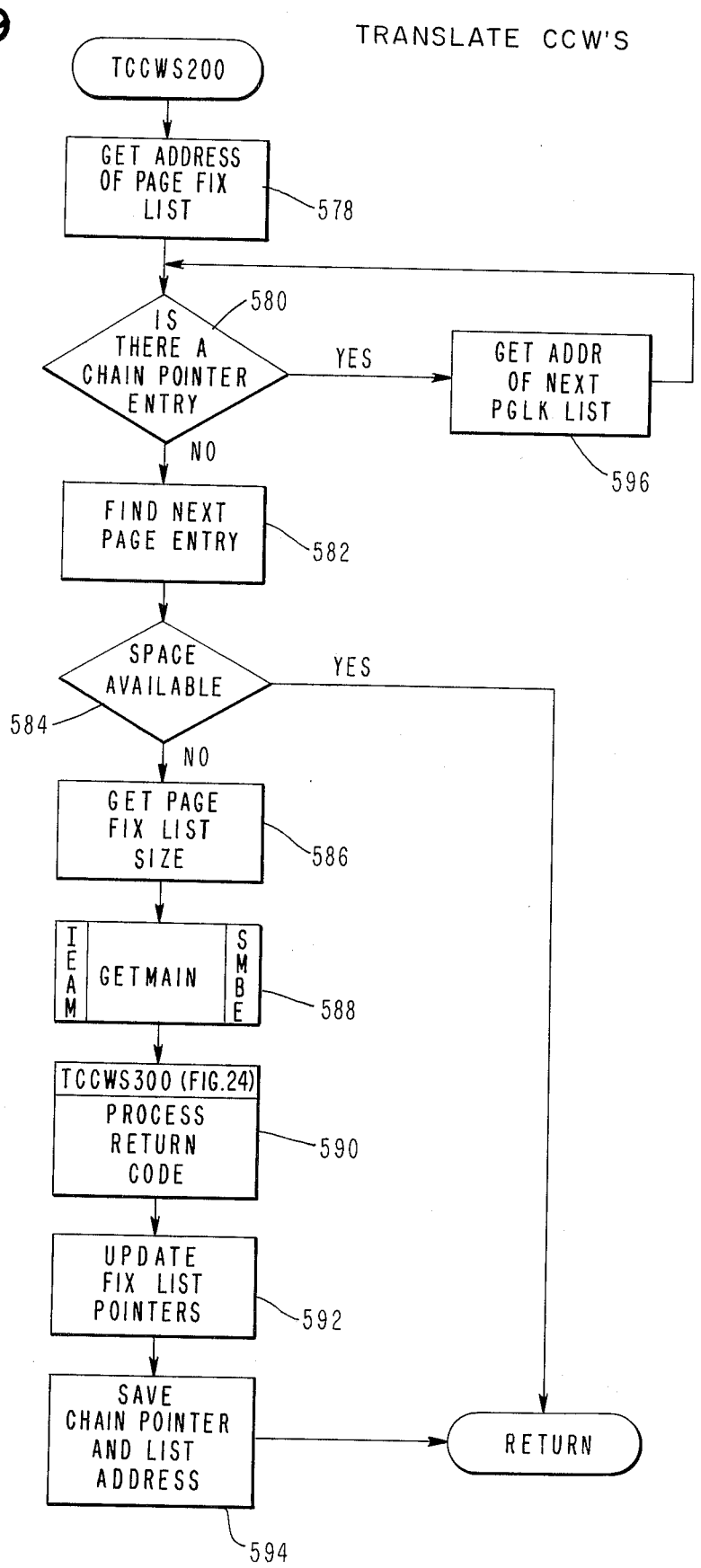
Figure 20:
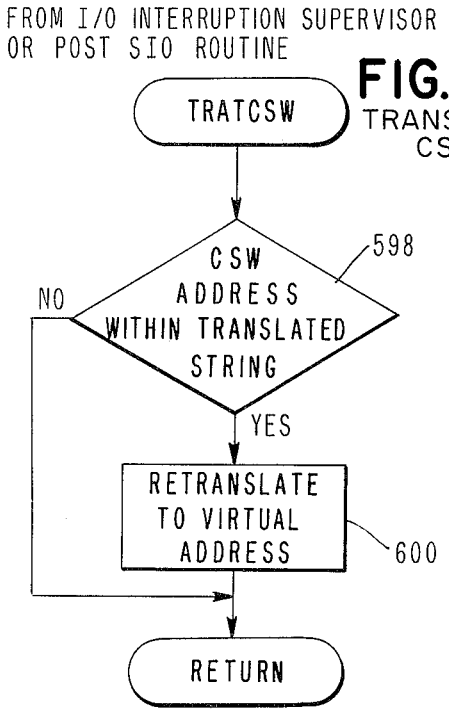
Figure 21:
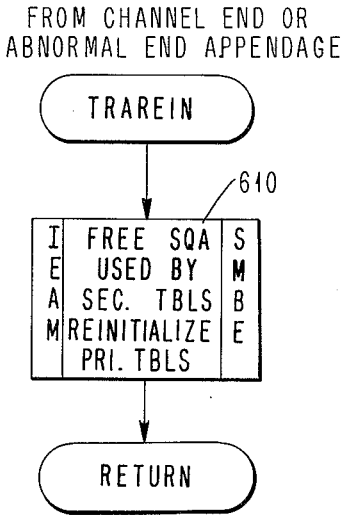
Figure 22:
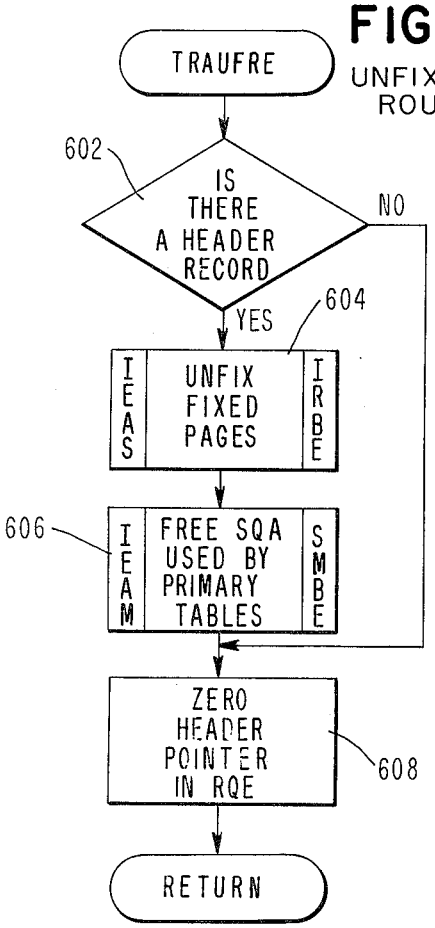
Figure 23:
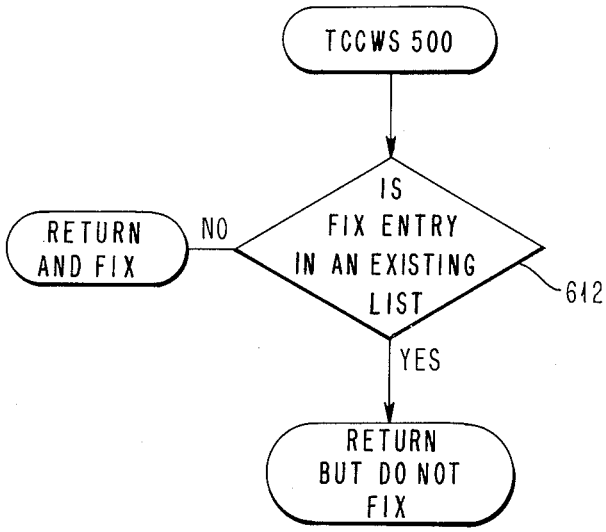
Figure 24:
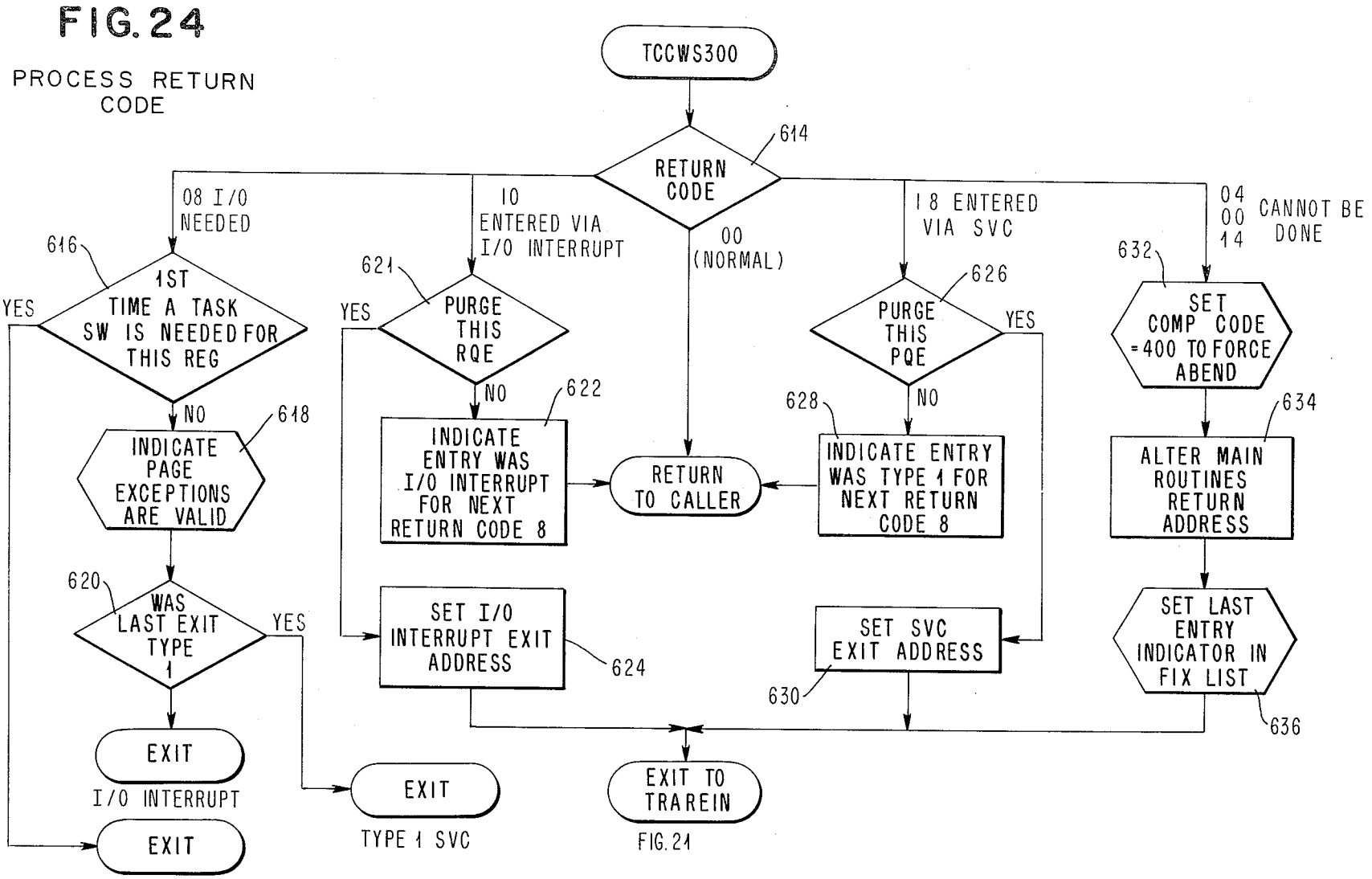

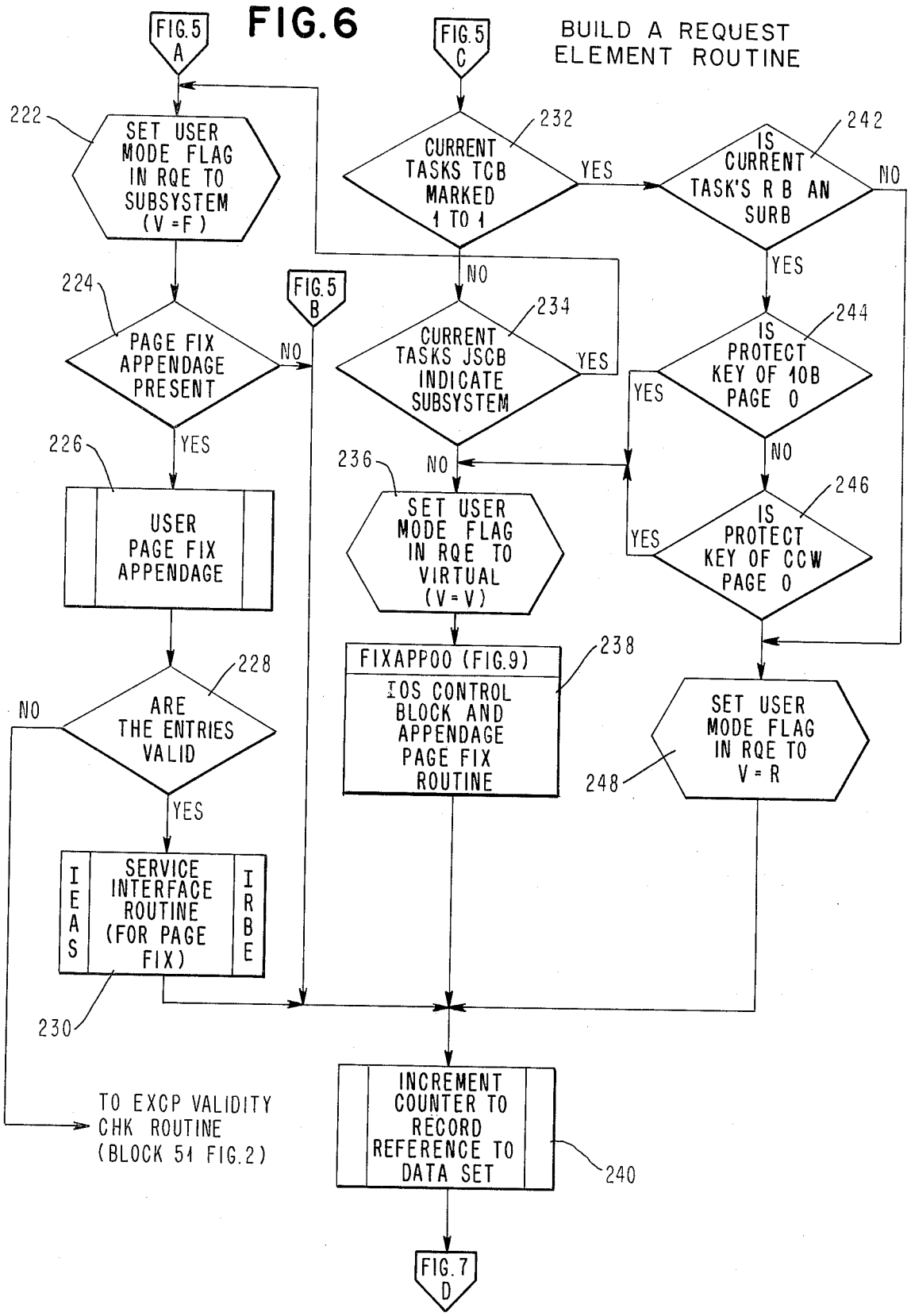
FIG.6
BUILD A REQUEST ELEMENT ROUTINE
FIG.5 A
FIG.5 C
FIG.5 B
222
SET USER MODE FLAG IN RQE TO SUBSYSTEM (V=F)
224
PAGE FIX APPENDAGE PRESENT
NO
YES
226
USER PAGE FIX APPENDAGE
228
ARE THE ENTRIES VALID
NO
YES
IEAS
SERVICE INTERFACE ROUTINE (FOR PAGE FIX)
IRBE
230
TO EXCP VALIDITY CHK ROUTINE (BLOCK 51 FIG.2)
232
CURRENT TASKS TCB MARKED 1 TO 1
YES
NO
234
CURRENT TASKS JSCB INDICATE SUBSYSTEM
YES
NO
236
SET USER MODE FLAG IN RQE TO VIRTUAL (V=V)
FIXAPP00 (FIG.9)
IOS CONTROL BLOCK AND APPENDAGE PAGE FIX ROUTINE
238
242
IS CURRENT TASK'S R B AN SURB
NO
YES
244
IS PROTECT KEY OF 10B PAGE 0
YES
NO
246
IS PROTECT KEY OF CCW PAGE 0
YES
SET USER MODE FLAG IN RQE TO V=R
248
INCREMENT COUNTER TO RECORD REFERENCE TO DATA SET
240
FIG.7 D

BUILD A REQUEST ELEMENT ROUTINE

TEST CHANNEL ROUTINE

FIX APPENDAGES & CONTROL BLOCKS
INITIALIZE TRANSLATE TABLES

FIX APPENDAGES & CONTROL BLOCKS
INITIALIZE TRANSLATE TABLES

START I/O SUBROUTINE

FIG. 16 TRANSLATE CCW'S

TRANSLATE CCW'S

TRANSLATE CCW'S

TRANSLATE CSW

REINITIALIZE TRANSLATE TABLES

UNFIX / FREE ROUTINE

PROCESS RETURN CODE